(12) United States Patent
Schmidt

(10) Patent No.: US 6,360,110 B1
(45) Date of Patent: Mar. 19, 2002

(54) SELECTABLE ASSIGNMENT OF DEFAULT CALL ADDRESS

(75) Inventor: Paul E. Schmidt, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/361,747

(22) Filed: Jul. 27, 1999

(51) Int. Cl.⁷ ................................................ H04B 1/38
(52) U.S. Cl. .............. 455/564; 379/355.02; 379/355.05
(58) Field of Search ................................ 455/564, 565, 455/552, 553; 379/355.01, 355.02, 355.03, 355.05, 355.06, 355.07, 355.09, 355.1, 356.01

(56) References Cited

U.S. PATENT DOCUMENTS

| | | | | |
|---|---|---|---|---|
| 4,087,638 A | * | 5/1978 | Hayes et al. ................. | 455/564 |
| 5,450,618 A | * | 9/1995 | Naddell et al. .......... | 455/200.1 |
| 5,491,745 A | | 2/1996 | Roeder | |
| 6,185,295 B1 | * | 2/2001 | Fredriksen et al. ......... | 379/355 |

FOREIGN PATENT DOCUMENTS

| | | |
|---|---|---|
| DE | 4336791 C1 | 10/1993 |
| EP | 0921452 A1 | 6/1999 |
| GB | 2262630 A | 6/1993 |
| GB | 2269721 A | 2/1994 |

\* cited by examiner

*Primary Examiner*—Lee Nguyen
(74) *Attorney, Agent, or Firm*—Coats & Bennett, P.L.L.C.

(57) ABSTRACT

A simplified method of assigning a call address to a PTT key for speed dialing in radio mode. The existing call addresses stored in memory are reviewed by the user and one of the call addresses is chosen as the default call address. This default call address is associated with a particular hot key, such as the PTT key. Thereafter, when the hot key is pressed to initiate a call without another call address currently pending, the default call address is used to initiate the call in radio mode. In preferred embodiments, the user may assign the call address to be the default without having to move the call address information from one memory location to another. Likewise, the user may change the call address assigned to be the default without having to move the call address information from one memory location to another. Thus, the present invention provides a simpler and less error prone procedure.

19 Claims, 4 Drawing Sheets

SELECTABLE ASSIGNMENT OF DEFAULT CALL ADDRESS

FIELD OF THE INVENTION

The present invention relates to the field of portable wireless communications devices, and more particularly to a method of variably assigning a default call address to a push-to-talk key of a portable wireless communications device.

BACKGROUND OF THE INVENTION

The use of portable wireless communications devices, such as cellular phones, personal communications assistants, and the like, is rapidly increasing throughout society. These wireless communications devices come in a wide variety of configurations, depending on their intended applications. For instance, common cellular telephones attempt to mimic traditional landline telephones, but with additional functionality, such as portability and memorization of large numbers of phone numbers. One trait of landline phones retained in most cellular phones is the ability to engage in full duplex communications. In the typical one-on-one conversation, full duplex operation allows both parties to simultaneously speak, as contrasted with the old prior art of mobile trunked-radio phones which allow only one party to speak at a time. In addition, with conference call or other multi-party capability, more than two parties can talk simultaneously. For ease of reference, this full duplex mode of operation will be referred to as "phone mode." The details of phone mode operation in cellular phones are well known in the art.

Some cellular phones are not only capable of operating in phone mode, but also in what will be referred to herein as radio mode. Examples of such devices may be seen in U.S. Pat. No. 5,450,618, which is incorporated herein by reference, and U.K. Patent Application 9214180.3. In radio mode, the phone appears to the user to handle communications in a half-duplex manner. That is, the cellular phone does not appear to the user as simultaneously transmitting and receiving voice data. Instead, the user must push a button known as a push-to-talk (PTT) button in order to include data corresponding to the user's voice in the data transmitted; otherwise, the phone appears to the user as if it is in receiving only.

In order to place a call, a user must first identify the desired recipient(s). Typically, this is done by entering a phone number, or other identifier, collectively referred to herein as a call address, via a keypad. Alternatively, a user may select the call address from a list of stored call addresses, commonly referred to as a "phone book." However, this process of entering numbers has proven to be cumbersome in some situations. As such, manufacturers have developed a variety of speed dial functions. For instance, a user may select a call address from memory by simply inputting the memory location, such as "87", and pressing the send key. Alternatively, super speed dial approaches have been developed where the first ten memorized call addresses may be accessed through a single key stroke. For instance, by pressing and holding the "7" key, the user both selects the call address in the seventh memory location and initiates a call session.

One problem with speed dial and super speed dial approaches is the fixed relationship between the key sequence and the memory location. That is, key sequence Y always selects the call address in memory location X. In order to change the call address associated with a particular key, or key sequence, the user is required to change the data in the corresponding memory location. Such a process is cumbersome and error prone.

Thus, there remains a need for a simplified method of assigning a call address to a particular key for speed dialing. In particular, there remains a need for a simplified method of assigning a default call address to a hot key, such as a PTT key. Preferably, the method would allow a user to selectively assign any one of a plurality of stored call addresses to be the default call address associated with the hot key. Thereafter, pressing the hot key, without first entering a pending call address, causes the wireless communications device to initiate a radio mode call to the default call address.

SUMMARY OF THE INVENTION

The present invention provides a simplified method of assigning a call address to a key for speed dialing in radio mode. The existing call addresses stored in memory are reviewed by the user, and one of the call addresses is chosen as the default call address. This default call address is associated with a particular key, such as the PTT key. Thereafter, when the key is pressed to initiate a call without another call address currently pending, the default call address is used to initiate the call in radio mode. In preferred embodiments, the user may assign the call address to be the default without having to move the call address information from one memory location to another. Likewise, the user may change the call address assigned to be the default without having to move the call address information from one memory location to another. Thus, the present invention provides a simpler and less error prone procedure.

DETAILED DESCRIPTION

Figure 1:
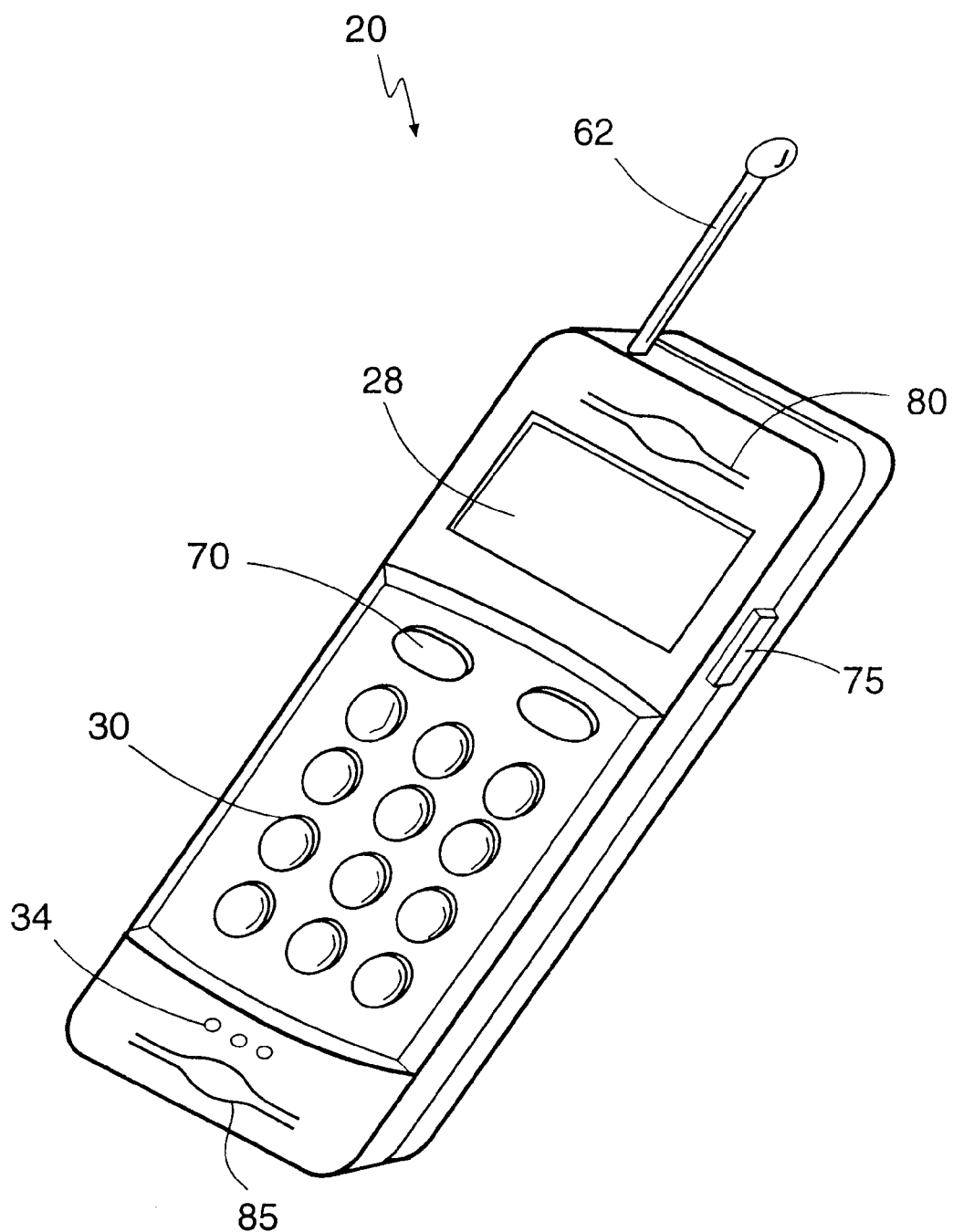
FIG. 1 is perspective view of one embodiment of a wireless communications device according to the present invention.
Figure 2:
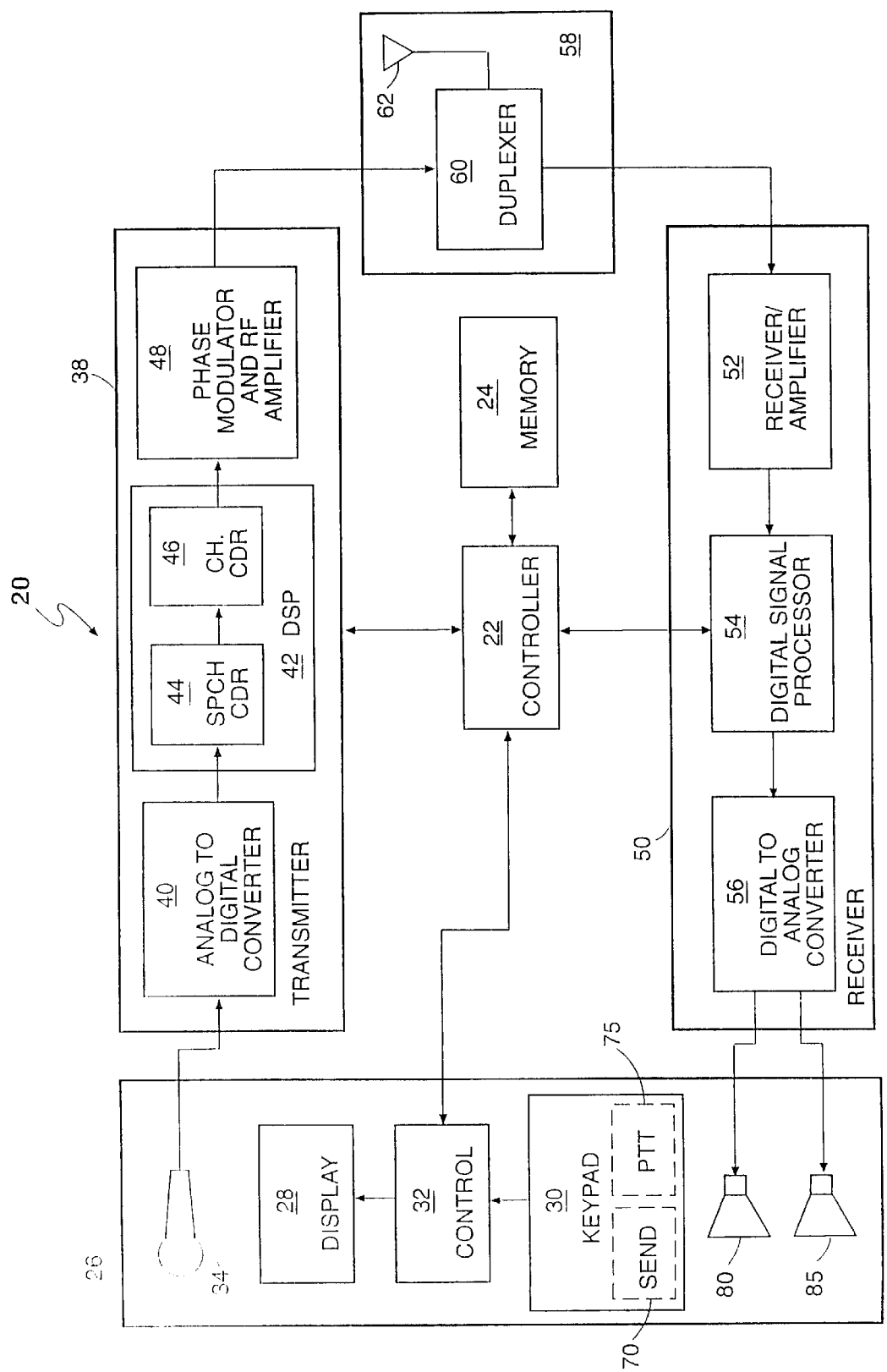
FIG. 2 is a schematic representing the wireless communications device of FIG. 1.

One preferred embodiment of a wireless communications device 20 of the present invention is shown in FIGS. 1 and 2. For clarity of illustration, a cellular telephone capable of transmitting and receiving digital signals will be used as an example of a wireless communications device 20 in the following discussion, but the invention is not so limited. Indeed, the present invention may apply to any wireless communications device 20, including cellular telephones, personal communications assistants, and so forth, whether using analog or digital communications.

The cellular telephone 20 typically includes a controller 22, an operator interface 26, a transmitter 38, a receiver 50, and an antenna assembly 58. The operator interface 26 typically includes a display 28, keypad 30, control unit 32, microphone 34, and two speakers 80,85. The display 28 allows the operator to see dialed digits, call status, and other service information. The keypad 30 allows the operator to dial numbers, enter commands, and select options. The control unit 32 interfaces the display 28 and keypad 30 with the controller 22.

The microphone 34 receives acoustic signals from the user and converts the acoustic signals to an analog electrical signal. Speakers 80,85 convert analog electrical signals from the receiver 50 to acoustic signals which can be heard by the user. The first speaker 80 is low, volume speaker, typically located above the display 28 so as to be proximate the user's ear when the phone 20 is held next to the user's head in the traditional telephone handset orientation. The second speaker 85 is a high volume speaker typically located on the opposite end of the phone 20 from the low volume speaker 80. See FIG. 1. The low volume speaker 80 acts as the phone's primary speaker when the phone is in "phone mode," and the high volume speaker 85 acts as the phone's primary speaker in "radio mode," as discussed in more detail below. As necessary, there may be a switch (not shown) disposed in the circuit path leading to the speakers 80,85 for routing the audio output to one speaker or the other. Such a switch should operate under the control of the controller 22, either directly or indirectly.

The keypad 30 includes a plurality of keys, including at least a first key 70 and a second key 75. For purposes of this illustration, the first key 70 is a send key and the second key is a PTT key. It is to be understood that the keys of the keypad 30 may be physical keys or virtual keys (such as shown on the display 28), and the keys do not need to be disposed on only one area of the phone 20. Indeed, it is preferred that the send key 70 be located some distance from the PTT key 75. For instance, the send key 70 may be proximate a common three by four telephone key array disposed on a front face of the phone 20 while the PTT key 75 may be located on the side of the phone 20, proximate the display 28. See FIG. 1.

The analog electrical signal from the microphone 34 is supplied to the transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42, which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48, which are shown as a combined unit in FIG. 2. The modulator converts the signal to a form, which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52, which shifts the frequency spectrum, and boosts the low-level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the controller 22. Speech data is processed by a speech decoder and passed to the digital to analog converter 56. The digital signal processor 54, may include, or may work in conjunction with, a DTMF tone detector (not shown).

The digital to analog converter 56 converts the speech data into an analog signal which is applied to one of speakers 80,85 to generate acoustic signals which can be heard by the user, as described in more detail below.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62, as necessary.

The controller 22 coordinates the operation of the transmitter 38 and the receiver 50, and may for instance take the form of a common microprocessor. This coordination includes power control, channel selection, timing, as well as a host of other functions. The controller 22 inserts signaling messages into the transmitted signals and extracts signaling messages from the received signals. The controller 22 responds to any base station commands contained in the signaling messages, and implements those commands. When the user enters commands via the keypad 30, the commands are transferred to the controller 22 for action.

Figure 3:
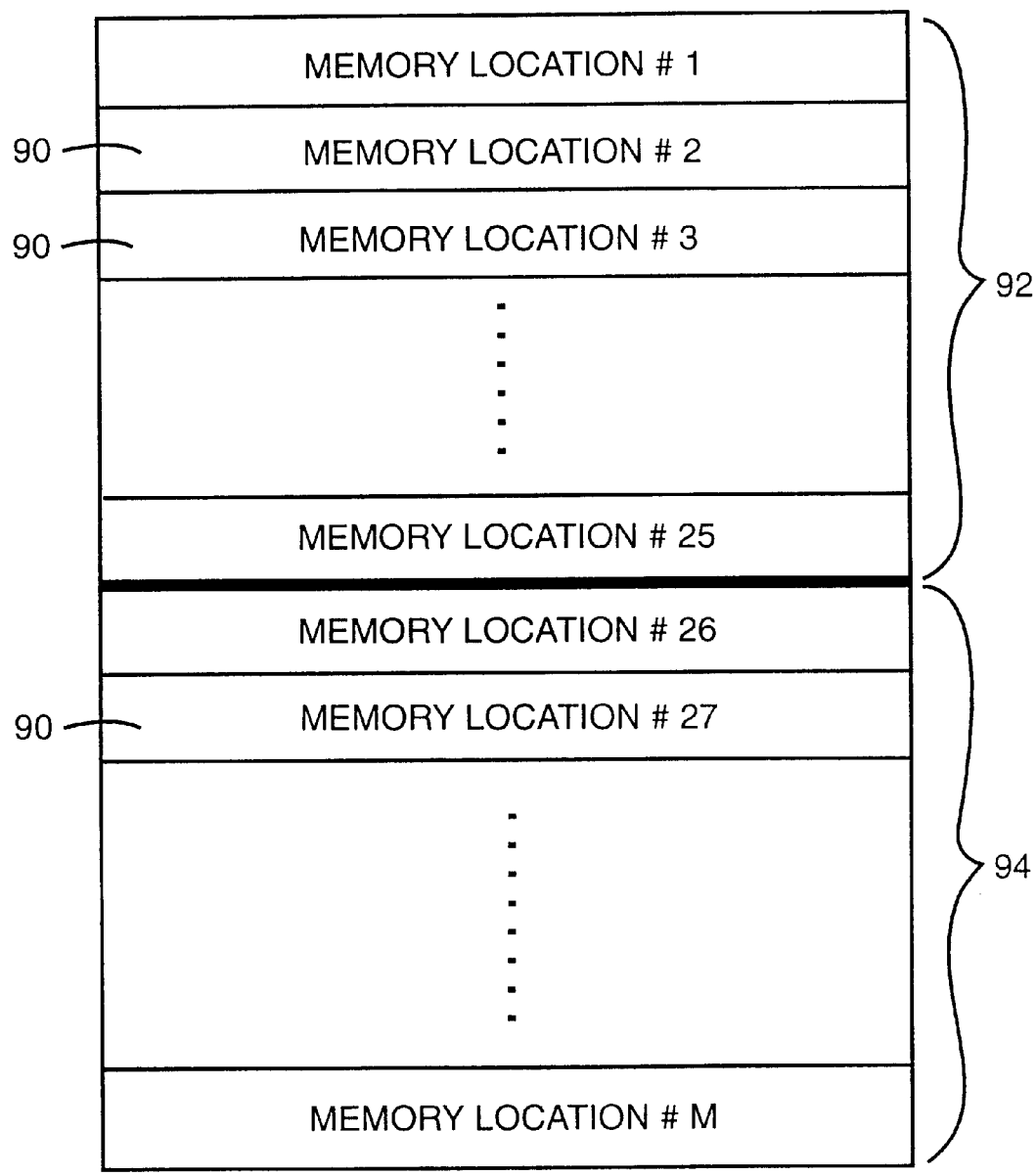
FIG. 3 shows a representation of a portion of memory including a plurality of memory locations for storing call addresses and related information.

Memory 24 stores and supplies information at the direction of the controller 22 and preferably includes both volatile and non-volatile portions. Included in memory 24 are a plurality of memory locations 90 for storing call addresses. See FIG. 3. These locations 90 may be thought of as divided into at least two sections, the first section 92 and the second section 94. The first section 92 includes the first N call address memory locations 90, while the second section 94 includes the balance. For purpose of illustration, N will be assumed to be 25, but any number higher than one may be used. The user enters call addresses to be stored in the memory locations 90 via any method known in the art. It is anticipated that the memory locations 90 may be filled non-contiguously; for instance, memory locations 1, 4, 8, 10, 24, and 35–45 may be filled, while the remainder may be empty.

The phone 20 is preferably operational in both phone mode and radio mode. Phone mode is simply a phone operational mode that is characterized by full duplex operation of the phone 20 in any manner well known in the art, such as according to ANSI-136. In phone mode, a conversation appears to the user of the phone 20 to be simultaneously bi-directional. This behavior is common in digital cellular phones of the prior art. Radio mode is a phone 20 operational mode wherein the phone 20 appears to the user to be operating in a half duplex mode. In radio mode, a conversation appears to the user of the phone 20 to be bi-directional, but not simultaneously. Instead, during the call session, the operation of the microphone 34 and the speaker 85 are mutually exclusive. When the PTT key 75 is pushed, the microphone 34 of the phone 20 is active; when the PTT key 75 is not pushed, the speaker 85 is active. For ease of reference, the condition of the PTT key 75 corresponding to the active microphone 34 may be called the "speak position" and the condition of the PTT key 75 corresponding to the active speaker 85 may be called the "listen position." This type of operation is familiar to users of existing trunked-radio phones. Thus, when in radio mode, the phone 20 mimics the man-machine interface of a trunked-radio phone.

Preferably, radio mode behavior of the phone 20 is localized to the phone 20, meaning that the communications between the phone 20 and the remainder of the wireless communications system are as a digital cellular phone in phone mode, but the man-machine interface appears to the user to be like a trunked-radio phone. Thus, when the phone 20 is operating in radio mode, the phone 20 may appear to the remainder of the communications system as being either full duplex or half duplex. The only requirement on the phone operating in radio mode is that the phone 20 appear to the user as being half duplex, regardless of the reality as viewed from the perspective of the communications system. The radio mode operation of a phone 20 is further disclosed in co-owned U.S. patent application Ser. No. 09/234,191 which is incorporated herein by reference.

Typically, a user will fill one or more of the available memory locations 90 with call address information. Call address information is typically a common phone number, such as one associated with another cellular phone, or a traditional landline phone, or a computer, or the like. In addition, there may be an alphanumeric identification tag associated with each call address, such as a name or the like. The term "call address" is used herein rather than "phone number" because while call address information may be a phone number, the call address information may instead be a group identification number used to establish a conference call between a predetermined group of phone numbers. In short, receipt of a group identification number causes the responsible portion of the wireless communications system to initiate call sessions with the members of the group such that the group members can participate in a conference call. Thus, the group identification number may be roughly thought of as a conference call trigger number, rather than a traditional phone number.

Once one or more memory locations 90 are filled with call address information, the user may assign a default call address to the PTT key 75 though a Default Call Address Selection Menu. In brief, the Default Call Address Selection Menu is a process that scrolls through the call addresses stored in some or all of memory 24 and sequentially puts forth the call addresses therein as candidate default call addresses for the user to accept or reject. When selected, the default call address is linked to the PTT key 75. The list of potential candidates may be all the call addresses in memory 24, or the candidate list may be limited to only a portion of the memory locations 90, such as the twenty-five memory locations 90 of the first section 92.

Figure 4:
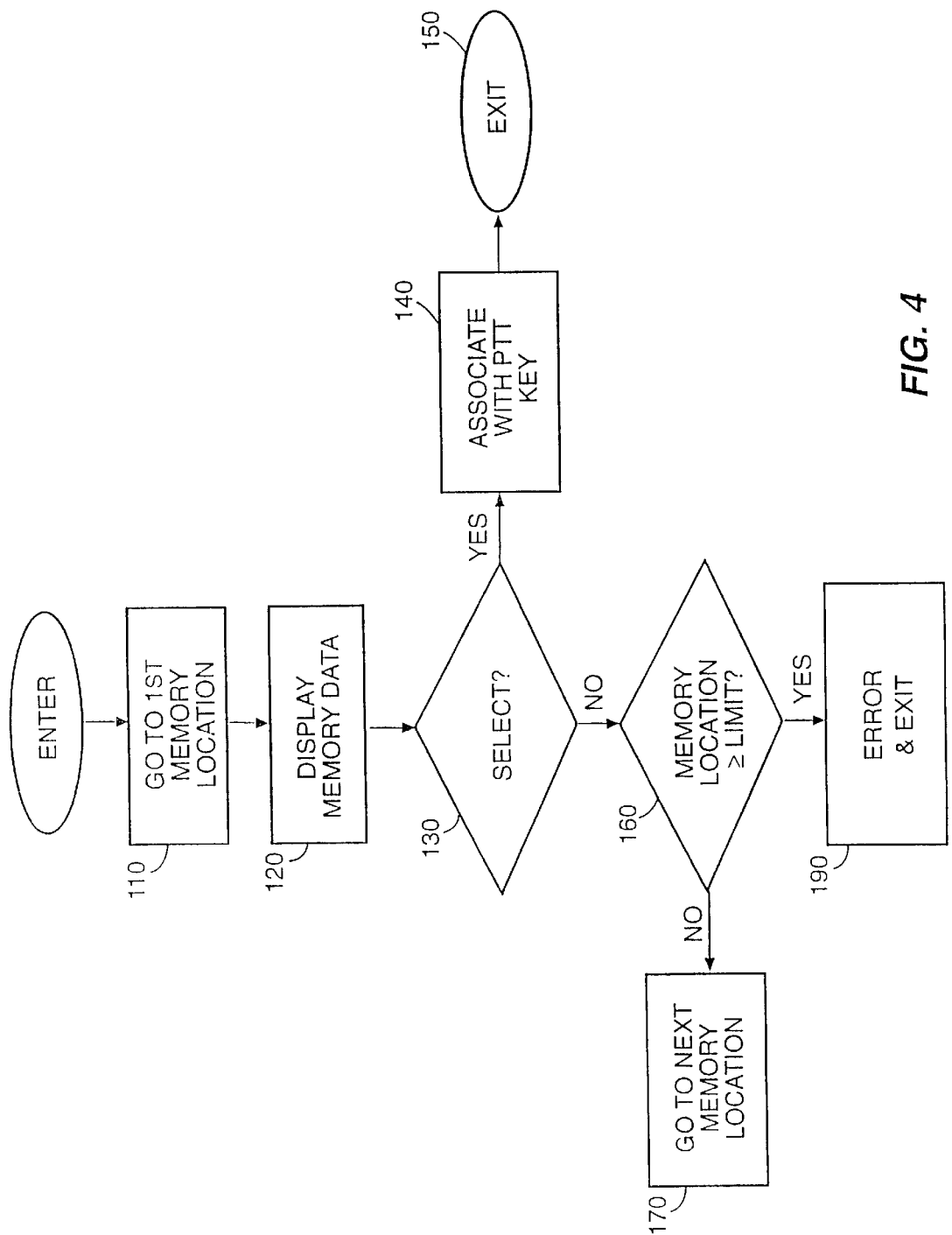
FIG. 4 shows one process flow for selecting and assigning a default call address to the PTT key.

Referring to FIG. 4, the Default Call Address Selection Menu process begins by retrieving the call address information stored in the first memory location 90 (box 110). At least a portion of the call address information of this memory location 90, such as the phone number, is displayed on the display 28 (box 120). Alternatively, the alphanumeric identification tag associated with this candidate call address, if present, may be displayed instead of, or in addition to, the phone number (box 120).

If this is the desired default call address, then the user selects this candidate (box 130) by pressing an appropriate key, such as a "yes" key. If another call address is desired, then the user rejects the candidate (box 130), such as by pressing a "no" key. If the process is not at the end of the candidate list (box 160), the process continues by moving to the next memory location 90 (box 170). The process continues until the end of the candidate call address list is reached or until a candidate is selected as the default call address. It should be noted that the process preferably skips memory locations 90 that do not contain call addresses (e.g., those that are empty), thereby shortening the selection process.

If the end of the stored list is reached without selecting a default call address (box 160), the process terminates with an error message (box 190). On the other hand, when a default call address is selected (box 130), the chosen call address is linked to the PTT key 75 (box 140) and the process ends (box 150). Typically, this linking will be via the setting of a pointer in memory 24, but any other known approach may be used. Once the default call address is set, the alphanumeric identification tag associated with the default call address, if any, is preferably shown on the display 28 when the phone 20 is in standby mode so that the user can easily identify the default call address associated with the PTT key 75.

Thereafter, when the PTT key 75 is pressed to initiate a call in radio mode, the phone 20 checks to see if a call address is currently pending; that is, whether a call address has been entered by a user but not acted upon. If there is a pending call address, that pending call address is used to initiate the call. If no call address is pending, the phone uses the default call address that is associated with the PTT key 75. For instance, the controller 22 may consult the pointer in memory 24 that points to the memory location 90 of the default call address.

It should be noted that the PTT key 75 may be moved to the speak position (e.g., pressed) for reasons other than to initiate a call in radio mode. For instance, the PTT key 75 may be pressed during an active call session so that the user's inputs to the microphone 34 may be transmitted to the other participant(s) in the call session at their respective remote locations. Thus, the reliance on the default call address associated with the PTT key 75 should apply only to situations where the phone 20 is not involved in an on-going call session.

One characteristic of preferred embodiments of the present invention is that the user may change the call address assigned as the default without having to move the call address information from one memory location 90 to another. Instead, the user may subsequently change the default call address assigned to the PTT key 75 by simply invoking the Default Call Address Selection Menu process again to select a new default from the call addresses stored in memory 24.

The procedure described above may be enhanced in some embodiments to ensure that the procedure cannot be exited without a call address being assigned as the default call address. If the user attempts to exit the Default Call Address Selection Menu without selecting a call address as the default, the phone 20 may optionally assign the first candidate call address as the default. Such a circumstance may arise in box 190, or if the user somehow aborts the process in mid-stream. Alternatively, the last encountered, or the last selected default, or most used call address may be assigned to be the default under such conditions. Additional error protection may be provided by likewise having the phone 20 automatically assign a call address as the new default in the event the user deletes the selected call address information.

It should be noted that other methods than pressing a "yes" or "no" key may be used to select the default call address. For instance, voice recognition or any other method of command entry may be used. In addition, a closed loop scroll-and-select approach may be used to move through the candidate call addresses. With such an approach, there may not be "yes" and "no" keys per se, rather there may be a scroll up, a scroll down, and a select key. The scroll up and scroll down keys may be used to go from one candidate call address to the next with the select key used to select the candidate call address as the default in the commonly known fashion associated with such scroll-and-select technology.

Preferably, the scrolling through the candidate call address list is done in a closed loop fashion such that the next candidate put forth after reaching the end of the list is the first candidate on the list, and so forth.

Further, the discussion above has assumed that the phone includes at least two speakers 80,85. However, this is not required. In some embodiments, the phone includes only one speaker, for instance the speaker 80 located far from the microphone 34. As above, the speaker 80 operates under the control of the controller 22. However, the speaker 80 in such a situation should have at least two operating speaker modes, corresponding to phone mode and radio mode. In phone mode, the speaker 80 would have a maximum allowed audio volume that is relatively low, while in radio mode, the speaker 80 would have a maximum allowed audio volume that is relatively higher. Thus, while the actual speaker volume may vary depending on user controlled volume settings and the incoming signal, the maximum volume of the speaker 80 can be controlled depending on the operating mode of the phone 20.

Using the present invention, the user is supplied with a simple method of variably assigning a call address as the default call address associated with the PTT key 75. In order to initiate a call in radio mode to the default call address (once chosen), the user need only press a single key, the PTT key 75, while no other call address is pending. Because the default call address may be stored anywhere in memory 24, or more preferably, anywhere in the first section 92 of memory 24, the user need not move stored call addresses around in memory 24 in order to change the call address assigned as the default. Rather, the present invention allows the default call address to be changed without changing memory locations 90. Thus, a simpler and less error prone method is provided.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of initiating a radio mode call in a wireless communications device having a first control key and a microphone and operative in at least a radio mode wherein said first control key has an enabling and a disabling state and wherein said first control key disabling state prevents sound received at said microphone from being transmitted to a remote location, the method comprising:
    entering a plurality of call addresses into respective memory locations of a plurality of memory locations local to said wireless communications device;
    selecting one of said plurality of call addresses as a first default call address;
    associating said first default call address with said first control key;
    allowing entry of a pending call address by a user prior to initiating a corresponding call by said wireless communications device;
    thereafter, depending on whether an alternate call address is pending, responding to said first control key being activated when said wireless communications device is not currently active in a communications session by either:
    a) automatically initiating a call in radio mode from said wireless communications device to said first default call address if an alternate call address is not pending; or
    b) automatically initiating a call in radio mode from said wireless communications device to said pending call address if an alternate call address is pending.

2. The method of claim 1 wherein said plurality of memory locations includes at least first and second sets of memory locations and wherein said first default call address is selected from call addresses stored in said first set of memory locations.

3. The method of claim 2 wherein said first set of memory locations includes more than 10 locations.

4. The method of claim 2 wherein said first set of memory locations includes more than 10 but less than 26 memory locations.

5. The method of claim 1 wherein said plurality of memory locations includes at least first and second sets of memory locations and wherein said selecting said first default call address includes scrolling through said first set of memory locations until a desired call address is reached.

6. The method of claim 5 wherein memory locations in said first set of memory locations not containing call addresses are skipped during said scrolling.

7. The method of claim 1 wherein said wireless communications device is a cellular phone.

8. The method of claim 1 further including revising said default call address to a second call address stored at a different memory location without changing the memory location of said first call address.

9. The method of claim 1 wherein said activation of said first control key includes pressing said first control key.

10. The method of claim 1 further including:
    a) selecting another one of said call addresses as a second default call address without changing the memory location of said first default call address;
    b) associating said second default call address with said first key and breaking the association of said first default call address to said first key; and
    c) thereafter, automatically initiating a call in radio mode from said wireless communications device to said second default call address in response to said key being activated if both
        i) an alternate call address is not pending; and
        ii) said wireless communications device is not currently active in a communications session.

11. The method of claim 1 wherein said call address is a group call address and wherein said call initiated in response to said first control key being pressed is a conference call.

12. The method of claim 1 wherein said associating said first default call address with said first control key includes setting a pointer in memory associated with said wireless communications device.

13. The method of claim 1 wherein said wireless communications device is further operative in at least a phone mode.

14. The method of claim 1 wherein said first default call address is different from the immediately previous call address to which the wireless communications device attempted to initiate a call.

15. The method of claim 14 wherein said selecting one of said call addresses as a first default call address occurs prior to said wireless communications device attempting to initiate a call to said immediately previous call address.

16. A wireless communications device, comprising:
    a) communications electronics including memory, said memory having stored therein at least two call addresses;
    b) a default call address selected from among said call addresses stored in memory;

c) at least one microphone in communication with said communications electronics;
d) a control key moveable between a listen position and a speak position;
e) wherein, in radio mode, sound received at said microphone is blocked from being transmitted to a remote location by said communications electronics when said control key is in said listen position;
f) wherein said device responds to said control key assuming said speak position when said device is not currently active in a communications session by, depending on whether an alternate call address is pending, either:
  i) automatically initiating a call in radio mode from said device to said default call address if an alternate call address is not pending; or
  ii) automatically initiating a call in radio mode from said device to said pending call address if an alternate call address is pending.

17. The device of claim 16 wherein, during a radio mode call session, sound received at said microphone may be transmitted by said communications electronics to a remote location when said control key is in said speak position.

18. The device of claim 16 wherein said memory includes at least first and second sets of memory locations and wherein said default call address is selected from call addresses stored in said first set of memory locations.

19. The device of claim 16 further including means for revising said default call address to a different call address without changing the memory location of the immediately previous call address.

* * * * *